(12) United States Patent
Schlintz et al.

(10) Patent No.: US 9,187,164 B2
(45) Date of Patent: Nov. 17, 2015

(54) MARINE POD BREAKAWAY CONNECTION

(71) Applicant: Caterpillar Inc., Peoria, IL (US)

(72) Inventors: John C. Schlintz, Milwaukee, WI (US);
Bryan L. Danner, Oshkosh, WI (US)

(73) Assignee: Caterpillar Inc., Peoria, IL (US)

( * ) Notice: Subject to any disclaimer, the term of this patent is extended or adjusted under 35 U.S.C. 154(b) by 138 days.

(21) Appl. No.: 14/015,340

(22) Filed: Aug. 30, 2013

(65) Prior Publication Data
US 2015/0060635 A1   Mar. 5, 2015

(51) Int. Cl.
*B63H 20/02* (2006.01)
*B63B 43/18* (2006.01)

(52) U.S. Cl.
CPC ............... *B63H 20/02* (2013.01); *B63B 43/18* (2013.01); *Y10T 137/1654* (2015.04)

(58) Field of Classification Search
CPC ........ B63B 39/061; B63B 43/18; B63H 5/07; B63H 5/125; B63H 20/02
USPC ..................................... 440/56, 112; 248/640
See application file for complete search history.

(56) References Cited

U.S. PATENT DOCUMENTS

| 2,681,029 A | 6/1954 | Canazzi |
| 2,917,019 A | 12/1959 | Krueger |
| 2,957,441 A | 10/1960 | Leipert |
| 2,973,738 A | 3/1961 | Ladewig |
| 4,236,478 A | 12/1980 | Mansson |
| 4,244,316 A | 1/1981 | Kulischenko |
| 4,634,389 A | 1/1987 | Eptaminitakis |
| 5,186,079 A | 2/1993 | Gee |
| 6,179,674 B1 | 1/2001 | Eichinger et al. |
| 7,182,657 B2 | 2/2007 | Mansson |
| 7,294,031 B1 | 11/2007 | Davis et al. |
| 7,584,934 B1 | 9/2009 | Eichinger |
| 7,690,959 B1 | 4/2010 | Szilagyi et al. |
| 7,867,046 B1 * | 1/2011 | Eichinger ..................... 440/56 |
| 8,011,983 B1 * | 9/2011 | Davis et al. .................. 440/56 |
| 2010/0297896 A1 | 11/2010 | Duncan |
| 2011/0195619 A1 | 8/2011 | Davis et al. |
| 2011/0294378 A1 | 12/2011 | Gallato et al. |

FOREIGN PATENT DOCUMENTS

WO   WO-2012/038305 A1   3/2012

* cited by examiner

*Primary Examiner* — Lars A Olson
(74) *Attorney, Agent, or Firm* — Miller, Matthias & Hull LLP

(57) ABSTRACT

A marine pod breakaway connection includes a breakaway connector connecting ends of a vertical shaft in an upper housing section and a vertical shaft in a lower housing section. The breakaway connector is configured to yield or fracture to allow the vertical shafts to separate during a breakaway condition when the lower housing section separates from the upper housing section. The breakaway connection further includes disconnect fittings having upper section in the upper and lower portions in the upper and lower housing sections, respectively, the engage and open when the housing sections are assembled to allow fluid flow, and close when the housing sections are separated to substantially prevent leakage of oil from the housing sections.

20 Claims, 10 Drawing Sheets

MARINE POD BREAKAWAY CONNECTION

TECHNICAL FIELD

This disclosure relates generally to watercraft hulls with bottom-mounted drive units for at least one propeller and, in particular, to securely mounting drive units to the watercraft hulls while minimizing vibration and preventing leakage, and to prevent failure or breach in the hull and oil leakage when the lower gear housing of the drive unit strikes a submerged object.

BACKGROUND

In personal and commercial watercraft, such as engine-driven fishing boats and speedboats, propulsion systems are often used in which a drive engine of the watercraft is arranged inside the watercraft and is actively connected, via a drive unit in the area of the watercraft's hull, to one or more propellers on the outside of the watercraft's hull. The drive unit typically passes through an opening in the hull or rear transom of the watercraft's hull, and usually includes an upper housing section or gear and clutch housing disposed inside the hull and having a drive shaft connected to an output shaft of the engine, and a lower housing section or underwater housing disposed outside the hull and having one or more output shafts connected to one or more propellers that rotate to drive the watercraft through the water. To avoid having the watercraft take on water through the opening in the hull, the drive unit must be secured within the opening with an arrangement that provides a sufficiently water-tight seal to prevent leakage when the watercraft is disposed and operated in the water.

One example of a known sealing arrangement is provided in U.S. Pat. No. 7,182,657, issued Feb. 27, 2007, to Mansson, which discloses a mounting arrangement wherein a boat hull is formed with a vertical well having an internal flange. The boat hull is used with a drive unit having a vertical drive shaft with an underwater housing connected to an upper gear housing, with the upper gear housing having a horizontal drive shaft for connection to an engine. A mounting plate of a drive unit and a screw-down plate are fastened to opposite sides of the internal flange, with compressible rings between surfaces of the mounting plate and the flange and between surfaces of the screw-down plate and the flange. The rings dampen vibrations from the drive to the hull. The propeller forces are transmitted via the mounting plate and the screw-down plate to the flange and the well and, thus, to the boat hull.

During operation, the watercraft may encounter submerged objects that impact the underwater housing of the drive unit. If the impact force is great enough, the object can damage the drive unit and the boat hull. To minimize the damage and cost to fix or replace damaged components, drive units have been designed so that particular components yield to allow the underwater housing to break away from the remainder of the drive unit and boat hull without causing additional damage. One example of a known of breakaway arrangement shown in U.S. Pat. No. 2,681,029, issued May 5, 1950, to Canozzi, which discloses a drive unit with a steering section having an upper section and a lower section connected by a pivot pin and a sheer pin. The upper section has an upper vertical shaft and the lower section has a lower vertical shaft. At the juncture of the upper and lower sections, companion chocolate elements are secured respectively to adjacent ends of the vertical shafts. The clutch elements are normally engaged for transmission of power between the vertical shafts. When the sheer pin is broken upon impact of the lower section with an object, the lower section swings about the axis of the pivot pin to minimize damage to the drive unit and boat hull, and the clutch elements and, correspondingly the vertical shafts, are separated to prevent bending or breaking of the vertical shafts.

The breakaway arrangement of the Canozzi patent may be effective in reducing damage to the drive unit with the boat hull in impact situations, but opportunities still exist for further improvements to underwater housing breakaway designs. In addition to damage to the drive unit and the boat hull, the potential exists for oil to leak into the water when the underwater housing detaches. Passages are provided for oil to flow from the upper housing section to the underwater section for lubrication of the gear case and shafts disposed therein. When the underwater section breaks away, oil may flow from the passages into the water. In view of this, a need exists for sealing the passages to prevent leakage of oil when the underwater section becomes detached.

SUMMARY OF THE DISCLOSURE

In one aspect of the present disclosure, a breakaway connector for a bottom-mounted drive unit for a watercraft hull is disclosed. The bottom-mounted drive unit may have a first housing section having a bottom surface and an upper vertical shaft having a lower end extending through the bottom surface of the first housing section, and a second housing section having a top surface and a lower vertical shaft having an upper end extending through the top surface of the second housing section. The breakaway connector includes an upper connector section receiving the lower end of the upper vertical shaft, a lower connector section receiving the upper end of the lower vertical shaft, and an intermediate connector section connecting the upper connector section to the lower connector section and having a reduced strength relative to a strength of the upper connector section and the lower connector section to yield and allow the lower connector section to displace relative to the upper connector section.

In another aspect of the present disclosure, a disconnect fitting for a bottom-mounted drive unit for a watercraft hull is disclosed. The bottom-mounted drive unit may have a first housing section having a bottom surface and a second housing section having a top surface. The disconnect fitting includes an upper first portion and a lower second portion. The upper first portion includes a first valve body having a lower end extending through the bottom surface of the first housing section and a first through bore defining a passage through the first valve body having a first valve seat and a first valve pin disposed within the first through bore and having a first seating surface. The first valve pin is movable between an open position with the first seating surface disengaged from the first valve seat and a closed position with the first seating surface engaging the first valve seat to form a seal substantially preventing liquid from leaking into and out of the first housing section through the first through bore. The upper first portion further includes a first resilient member engaging the first valve pin and biasing the first valve pin toward the closed position. The lower second portion includes a second valve body having an upper end extending through the top surface of the second housing section and a second through bore defining a passage through the second valve body having a second valve seat, and a second valve pin disposed within the second through bore and having a second seating surface. The second valve pin is movable between an open position with the second seating surface disengaged from the second valve seat and a closed position with the second seating surface engaging the second valve seat to form a seal substantially preventing liquid from leaking into and out of the second housing section through the second through bore. The lower second portion further includes a second resilient member engaging the second valve pin and biasing the second valve pin toward the closed position. The lower end of the first valve body and the upper end of the second valve body are aligned and are brought together so that the first valve pin and the second valve pin engage and move to the open positions to place an interior of the first housing section in fluid communication with an interior of the second housing section without leakage of fluid through the lower end of the first valve body and the upper end of the second valve body.

In a further aspect of the present disclosure, a bottom-mounted drive unit for a watercraft hull is disclosed. The bottom-mounted drive unit includes a first housing section having a bottom surface, a second housing section having a top surface, and a breakaway connector having a lower section, an upper section and a reduced strength intermediate section. The first housing section includes an upper vertical shaft having a shaft lower end extending through the bottom surface of the first housing section, and a disconnect fitting upper portion having a lower end extending through the bottom surface of the first housing section, wherein the disconnect fitting upper portion has a normally closed position with a seal substantially preventing leakage of liquid from an interior of the first housing section to the bottom surface of the first housing section, and an open position placing the interior of the first housing section in fluid communication with the bottom surface of the first housing section. The second housing section includes a lower vertical shaft having a shaft upper end extending through the top surface of the second housing section, and a disconnect fitting lower portion having an upper end extending through the top surface of the first housing section, wherein the disconnect fitting lower portion has a normally closed position with a seal substantially preventing leakage of liquid from an interior of the second housing section to the top surface of the second housing section, and an open position placing the interior of the second housing section in fluid communication with the top surface of the second housing section. The lower section of the breakaway connector receives and engages the upper end of the lower vertical shaft and the upper section of the breakaway connector receives and engages the lower end of the upper vertical shaft so that the lower vertical shaft, the upper vertical shaft and the breakaway connector rotate together about a common longitudinal axis and with the intermediate portion of the breakaway connector disposed at an interface between the upper end of the lower vertical shaft and the lower end of the upper vertical shaft. The disconnect fitting upper portion and the disconnect fitting lower portion are aligned and engage each other to place the disconnect fitting upper portion and the disconnect fitting lower portion in the open positions and thereby place the interior of the first housing in fluid communication with the interior of the second housing without leakage of fluid to the top surface of the first housing portion and the bottom surface of the second housing portion.

Additional aspects are defined by the claims of this patent.

BRIEF DESCRIPTION OF THE DRAWINGS

FIG. 15 is a cross-sectional view of an embodiment of a disconnect fitting in accordance with the present disclosure with the upper and lower portions assembled to allow fluid flow there through;

FIG. 16 is the cross-sectional view of the disconnect fitting with the upper and lower portions separated and closed to prevent fluid flow there through.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Figure 1:
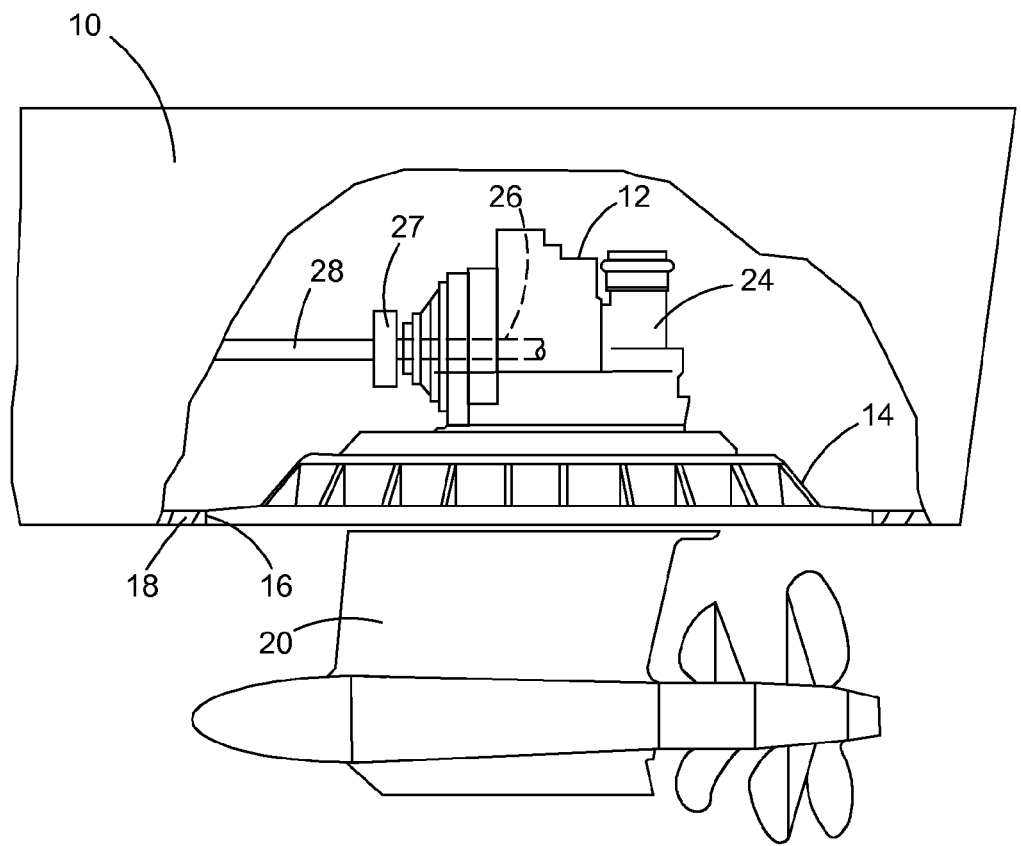
FIG. 1 is a side view of an aft portion of a boat hull with a bottom-mounted drive unit secured thereto with a portion of the boat hull removed to reveal the drive unit and a hull seal assembly in accordance with the present disclosure.

FIG. 1 illustrates an aft portion of a boat hull 10 having a portion removed to expose an inboard portion of a drive unit 12 and a hull seal assembly 14 securing the drive unit 12 within an opening 16 through a bottom wall 18 of the boat hull 10. The boat hull 10 may be formed by casting fiberglass reinforced polyester plastic or by fabricating other appropriate materials to form the shape of the boat hull 10. The drive unit 12 may include a lower or underwater housing section 20 disposed in the water below the bottom wall 18 and the hull seal assembly 14. The underwater housing section 20 may house concentric propeller shafts (not shown) having rotatably mounted individual propellers 22 that may counter-rotate to propel the watercraft though the water.

The drive unit 12 may further include an upper gear housing section 24 disposed within the boat hull 10 and having a horizontal input shaft 26 extending there from connected by an input flange 27 via a splined connection to a drive shaft 28 from the boat's engine (not shown). The input shaft 26 may drive the propeller shafts and, correspondingly, the propellers 22 via gearing (not shown) within the gear housing section 24 connecting the input shaft 26 to a vertical shaft (not shown) extending through the housing sections 20, 24 and an intermediate housing section 40 (FIGS. 2 and 3) to additional gearing (not shown) connecting the vertical shaft to the propeller shafts in the underwater housing section 20. As illustrated, the propellers 22 are disposed aft of the underwater housing section 20 and push the watercraft through the water. However, those skilled in the art will understand that the drive unit 12 may be configured with the propellers 22 disposed forward of the underwater housing section 20 and pull the watercraft forward through the water. Likewise, those skilled in the art will appreciate that the drive unit 12 may be configured with one or more of the propellers 22, and the disclosure is not limited to the drive unit 12 having two of the propellers 22. The propellers 22 may be of various shapes and sizes.

Figure 2:
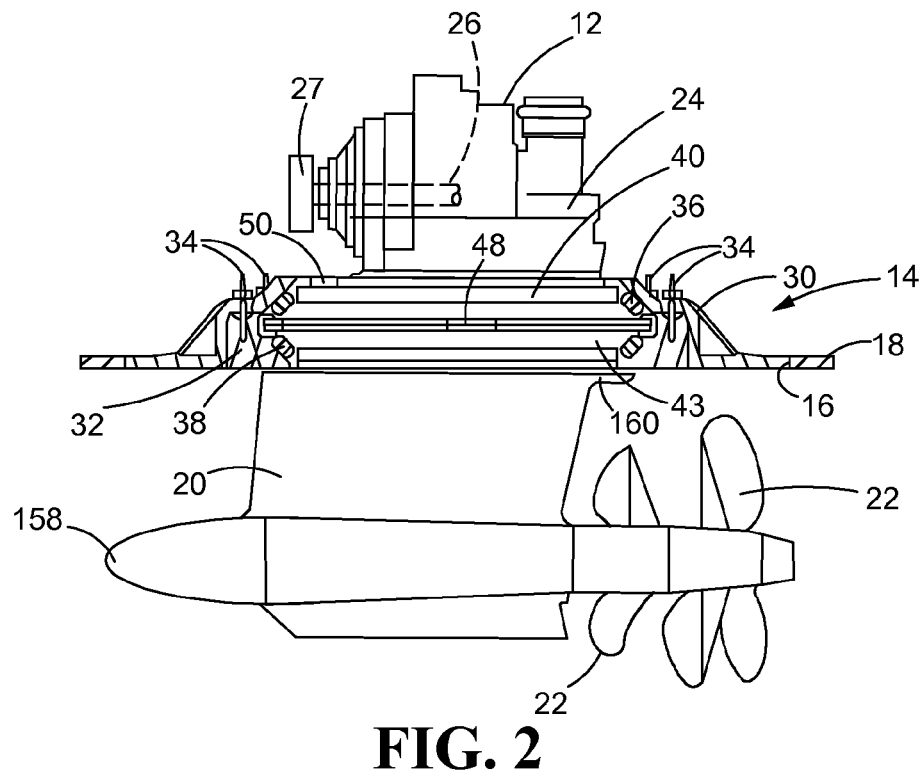
FIG. 2 is an assembly view of the boat hull and bottom-mounted drive unit of FIG. 1 with the components of the hull seal assembly shown in cross-section.

The hull seal assembly 14 is shown in greater detail in FIG. 2. The components of the hull seal assembly 14 are shown in cross-section while the drive unit 12 is illustrated in whole. The hull seal assembly 14 may include a hull support ring 30 mounted to the bottom wall 18 of the boat hull 10 and surrounding the opening 16. A clamp ring 32 may be installed around the drive unit 12 and fastened to the hull support ring 30 by studs 34 or other appropriate fasteners. An upper ring seal 36 and a lower ring seal 38 may be installed between corresponding surfaces of the drive unit 12, the hull support ring 30 and the clamp ring 32 to form substantially water-tight seals preventing leakage of water into the inboard compartment of the boat hull 10. In alternative embodiments, a sensor may be located adjacent to the upper ring seal 36 or the lower ring seal 38 to measure for leakage.

Figure 3:
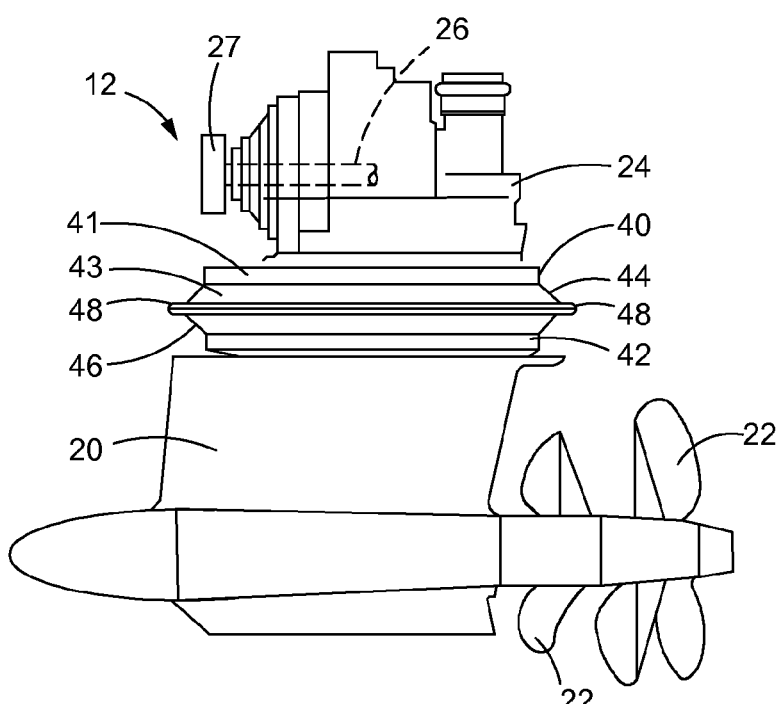
FIG. 3 is a side view of the drive unit of FIG. 1 detached from the boat hull.

FIG. 3 illustrates the drive unit 12 before installation in the opening 16 of the boat hull 10 and securement by the hull seal assembly 14. The underwater housing section 20 and the gear housing section 24 may be connected by an intermediate housing section 40 configured to be engaged by the hull support ring 30 and the clamp ring 32 of the hull seal assembly 14 to retain the drive unit 12 within the opening 16 in the boat hull 10. The intermediate housing section 40 has a shape when viewed from the top that is complimentary to the shapes of the opening 16 of the boat hull 10, the hull support ring 30 and the clamp ring 32. The intermediate housing section 40 may be formed by an upper plate 41 and a lower plate 42 connected together. The plates 41, 42 may be fabricated from the same material, such as aluminum, or may be formed from different materials where the material for the lower plate 42, such as bronze, may be more resistant to rust, corroding, or other degradation that may occur due to extended contact with the water in which the boat hull 10 is disposed. The intermediate housing section 40 may include an outwardly extending retention portion 43 formed by the plates 41, 42 and that may include an upwardly facing lateral edge surface 44 on the upper plate 41, a downwardly facing lateral edge surface 46 on the lower plate 42 and a plurality of outwardly extending ribs 48. One or both of the lateral edge surfaces 44, 46 may be tapered or beveled as shown in FIG. 3, or may have other orientations, such as horizontal or reverse tapered, as necessary to form complimentary relationships with corresponding surfaces of the hull support ring 30 and the clamp ring 32, and with the seals 36, 38 of the hull seal assembly 14 to secure the drive unit 12 without substantially leakage. The ribs 48 may be spaced about the periphery of the outwardly extending retention portion 43 at locations corresponding to recesses of the clamp ring 32 that are illustrated and described in greater detail hereinafter.

Figure 4:
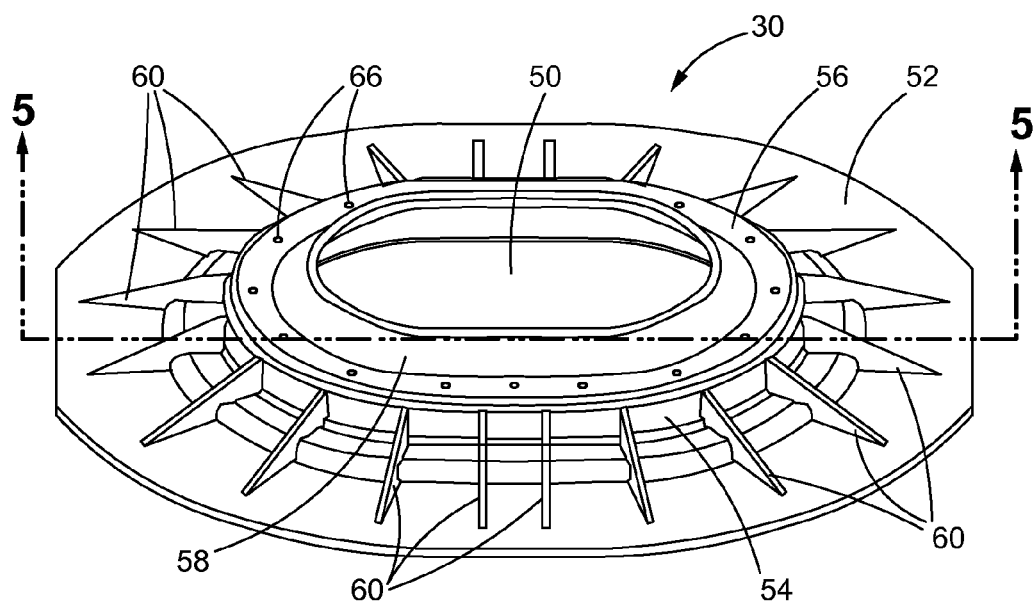
FIG. 4 is a perspective view of an embodiment of a hull support ring of the hull seal assembly of FIG. 2.

The hull support ring 30 as illustrated in FIG. 4 may be generally oval-shaped to correspond to the shape of the opening 16 in the boat hull 10. The hull support ring 30 may be a separate, unitary component that is fabricated and subsequently mounted to the boat hull 10 about the opening 16 with suitable fasteners and sealing mechanism to prevent leakage through the interface between the hull support ring 30 and the bottom wall 18 of the boat hull 10. In one exemplary implementation, the hull support ring 30 may be preformed or pre-molded separately from the fabrication of the boat hull 10. After both components 10, 30 are formed, the hull support ring 30 is set in place at the opening 16 and permanently bonded by glue or other fastening mechanism to the boat hull 10. Alternatively, the hull support ring 30 may be integrally formed with the boat hull 10 as a single, unitary component. For example, the hull support ring 30 may be fiberglassed in a hull mold and formed as one component with the boat hull 10 as the boat hull 10 is formed. The hull support ring 30 defines a central opening 50 sized and shaped to receive the upper gear housing section 24 of the drive unit 12 when the drive unit 12 is install in the boat hull 10. A lower generally horizontal outwardly extending flange 52 may provide a surface for attachment of the hull support ring 30 to the boat hull 10, or may form a portion of the bottom wall 18 of the boat hull 10 where the components are integrally formed.

Figure 5:
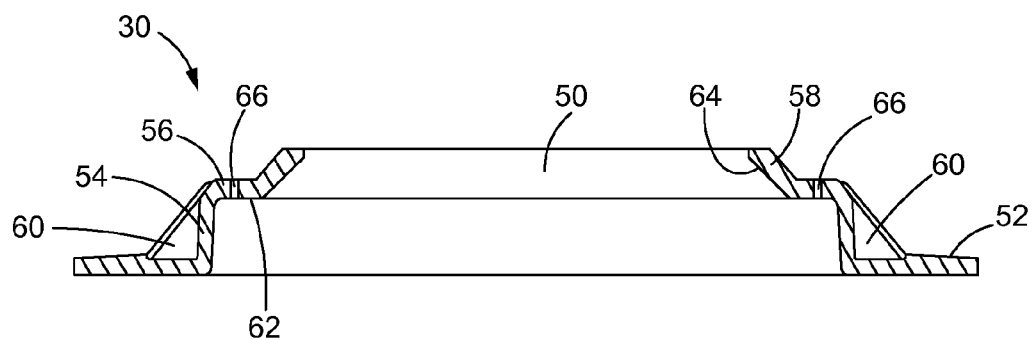
FIG. 5 is a cross-sectional view taken through line 5-5 in FIG. 4 of the hull support ring.

As more clearly shown in the cross-section of FIG. 5, the hull support ring 30 may further include a upwardly extending generally vertical flange portion 54 extending upwardly from the outwardly extending flange 52, an inwardly extending generally horizontal flange portion 56 extending inwardly from an upper edge of the flange portion 54, and a tapered flange portion 58 extending upwardly and inwardly from an inner edge of the inwardly extending flange portion 56. To provide additional structural support, the hull support ring 30 may further include a plurality of structural supports 60 spaced about the vertical flange portion 54 and extending between the vertical flange portion 54 and the outwardly extending flange 52. The generally horizontal flange portion 56 has a corresponding generally horizontal downwardly facing inner surface 62, and the tapered flange portion 58 has a corresponding downwardly facing support ring surface 64. The downwardly facing support ring surface 64 is illustrated as being tapered or beveled, but may be oriented closer to horizontal if necessary to cooperate with and match the orientation of the upwardly facing lateral edge surface 44 of the intermediate housing section 40 to retain the drive unit 12.

Similarly, the downwardly facing inner surface 62 may be tapered or angled as necessary to cooperate with the corresponding surface of the clamp ring 32 as discussed more fully below. The generally horizontal flange portion 56 may also include a plurality of bores 66 passing there through and spaced about the flange portion 56 for receiving corresponding studs 34 for securing the clamp ring 32 to the hull support ring 30.

Figure 6:
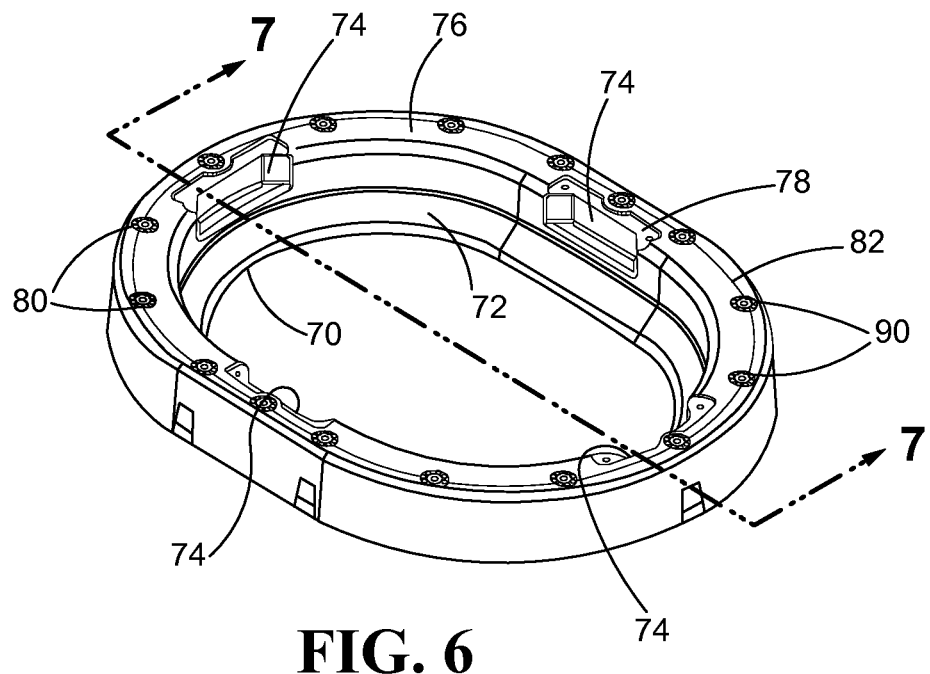
FIG. 6 is a perspective view of an embodiment of a clamp ring of the hull seal assembly of FIG. 2.
Figure 7:
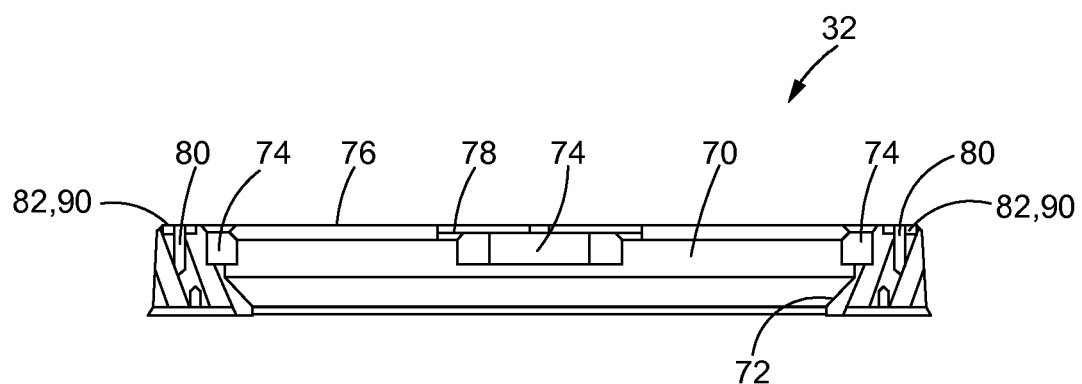
FIG. 7 is a cross-sectional view taken through line 7-7 in FIG. 6 of the clamp ring.

The clamp ring 32 has a shape corresponding to the shapes of the opening 16 in the boat hull 10 and the hull support ring 30 as shown in FIGS. 6 and 7. The clamp ring 32 is sized to be received by the hull support ring 30 within the boundary established by the upwardly extending flange portion 54. The clamp ring 32 has an opening 70 there through configured to be disposed about the intermediate housing section 40 of the drive unit 12. Within the opening 70, the clamp ring 32 includes an upwardly facing clamp ring surface 72. As best illustrated in the cross-section of FIG. 7, the upwardly facing clamp ring surface 72 may be tapered or beveled as necessary to have a complimentary shape to the downwardly facing lateral edge surface 46 of the intermediate housing section 40. However, the upwardly facing clamp ring surface 72 may be more generally horizontal if necessary for retention of the outwardly extending retention portion 43 within the hull seal assembly 14.

An upper portion of the opening 70 may include a plurality of rib receiving recesses 74 spaced about the clamp ring 32 at locations corresponding to the ribs 48 extending from the outwardly extending retention portion 43 of the intermediate housing section 40 as described above. At a generally horizontal upwardly facing surface 76 of the clamp ring 32, each rib receiving recess 74 may have an open upper end 78 allowing the corresponding rib 48 to be inserted therein during assembly of the intermediate housing section 40. After insertion of the ribs 48 into the rib receiving recesses 74, cover plates 92 (FIG. 10) may be installed to cover the open upper ends 78 of the rib receiving recesses 74 and retain the ribs 48 therein as will be discussed more fully below. The generally horizontal upwardly facing surface 76 of the clamp ring 32 may have a complimentary shape to the downwardly facing inner surface 62 of the hull support ring 30, and may include a plurality of bores 80 passing there through and spaced about the downwardly facing inner surface 62 at locations corresponding to the bores 66 of the hull support ring 30 for receiving corresponding studs 34 to secure the clamp ring 32 to the hull support ring 30.

Figure 8:
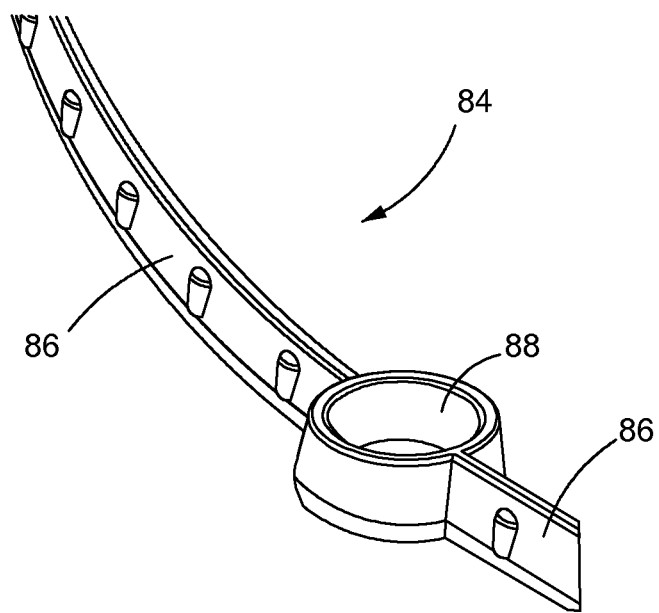
FIG. 8 is a perspective view of a portion of an embodiment of a clamp ring seal of the hull seal assembly of FIG. 2.

The upwardly facing surface 76 may further include a clamp ring seal recess 82 defined therein and surrounding the opening 70 of the clamp ring 32. The clamp ring seal recess 82 may be shaped to receive a clamp ring seal 84, a portion of which is shown in FIG. 8. The clamp ring seal 84 may be configured to accommodate the bores 66, 80 of the hull support ring 30 and the clamp ring 32, respectively, and studs 34 disposed therein to prevent leakage across the interface between the downwardly facing inner surface 62 and the upwardly facing surface 76. Consequently, the clamp ring seal 84 may be configured with alternating strap portions 86 and annular portions 88 that are spaced to correspond to bores 80 through the upwardly facing surface 76 of the clamp ring 32. Returning to FIGS. 6 and 7, the clamp ring seal recess 82 may include annular recess portions 90 surrounding the corresponding bores 80 and configured to receive corresponding annular portions 88 of the clamp ring seal 84 with the corresponding bores 80 encircled by the annular portions 88. The clamp ring seal recess 82 and the clamp ring seal 84 are dimensioned so that an upper edge of the clamp ring seal 84 extends above the upwardly facing surface 76 so that the clamp ring seal 84 engages the downwardly facing inner surface 62 of the hull support ring 30 when the clamp ring 32 is secured thereto to form a substantially water-tight seal there between.

Figure 9:
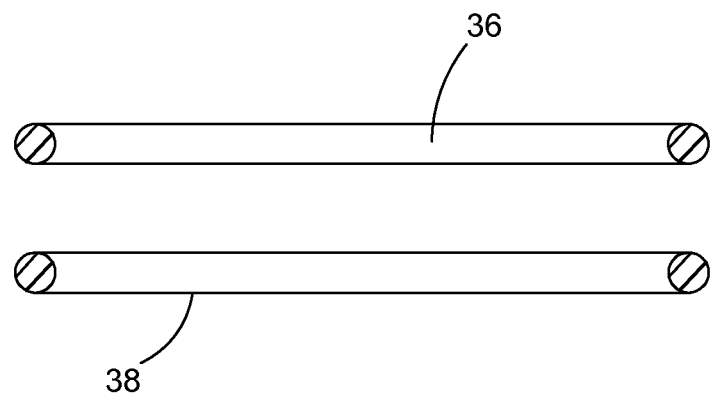
FIG. 9 is cross-sectional views of upper and lower ring seals of the hull seal assembly of FIG. 2.

FIG. 9 illustrates exemplary embodiments of the upper ring seal 36 and the lower ring seal 38 shown in cross-section. The ring seals 36, 38 may be formed from a resilient elastomeric material, and have complimentary shapes in horizontal projection to the hull support ring 30, the clamp ring 32 and to the outwardly extending retention portion 43 of the intermediate housing section 40. As shown, the ring seals 36, 38 may have circular cross-sections in their normal configuration and not compressed between complimentary surfaces to form seals there between. However, those skilled in the art will understand that the ring seals 36, 38 may have alternative cross-section shapes as necessary to form adequate seals between the complimentary surfaces.

The drive unit 12 may be configured to allow the underwater housing section 20 to break away from the intermediate housing section 40 in any direction and drop or otherwise move away from the bottom 18 with minimal damage to the drive unit 12 and the boat hull 10, and with minimal oil leakage from either component of the drive unit 12. The clean breakaway may be accomplished in part by the use of breakaway mounting bolts (not shown) connecting the underwater housing section 20 to the intermediate housing section 40. The mounting bolts may be fabricated to fracture at a predetermined impact load to the underwater housing section 20 applied in any direction so that the underwater housing section 20 separates with only minor or no damage to the bottom 18 of the boat hull 10. It is also necessary to ensure that the meeting or cooperating components in the underwater housing section 20 and the intermediate housing section 40 disengage and separate in a manner that does not cause damage to the components or result in oil leakage after the mounting bolts breakaway.

Figure 10:
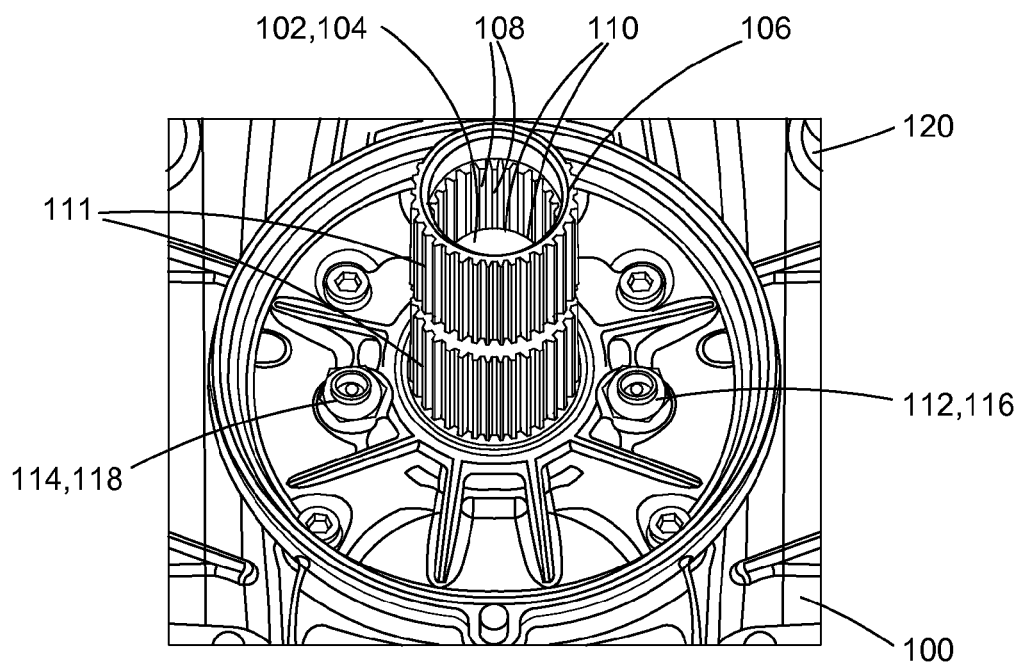
FIG. 10 is a top view of a central portion of a top surface of the underwater housing section of the drive unit of FIG. 3 and an embodiment of a breakaway connection in accordance with the present disclosure mounted on a lower vertical shaft.
Figure 11:
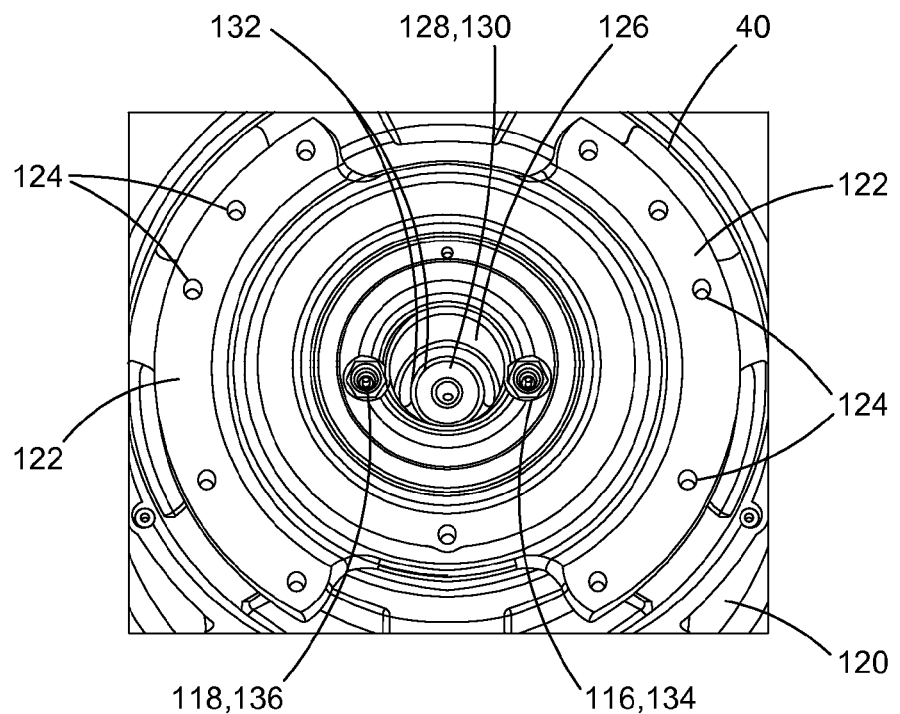
FIG. 11 is a bottom view of a central portion of a bottom surface of the intermediate housing section of the drive unit of FIG. 3.

FIGS. 10 and 11 illustrate one configuration of the underwater housing section 20 and the intermediate housing section 40 for substantially reducing or eliminating destruction of parts of the drive unit 12 and oil leakage during a break away situation. Referring to FIG. 10, a top surface 100 of the underwater housing section 20 has an upper end of 102 of a lower vertical shaft 104 extending there from. Lower vertical shaft 104 may have an opposite end (not shown) operatively connected to gearing and to the propeller shafts to drive the propellers 22. The upper end 102 of the lower vertical shaft 104 may be received by a breakaway connector 106 that engages the upper end 102 so that the lower vertical shaft 104 and the breakaway connector 106 rotate together. In the illustrated embodiment, the breakaway connector 106 has a plurality of internal parallel longitudinally extending splines 108 that mesh with corresponding external longitudinally extending splines 110 on the upper end 102 of the lower vertical shaft 104 so that the vertical shaft 104 and the breakaway connector 106 rotate together about a longitudinal axis of the vertical shaft 104. The breakaway connector 106 may also have a plurality of external parallel longitudinally extending splines 111 that may serve to weaken the walls of the breakaway connector 106 so that the walls fracture and thereby allow the lower vertical shaft 104 and underwater housing section 20 to separate from the drive unit 12 in a breakaway situation as discussed more fully below. Also extending through the top surface 100 of the underwater housing section 20 are lower portions 112, 114 of disconnect fittings 116, 118, respectively, that will provide fluid connections for lubricant passages in the underwater housing section 20 with corresponding passages in the intermediate housing section 40 as will be discussed more fully below.

FIG. 11 illustrates a bottom surface 120 of the intermediate housing section 40 that is configured to face and mate with the top surface 100 of the underwater housing section 20. The bottom surface 120 includes a flange or flanges 122 having bores 124 that will have corresponding bores (not shown) on the top surface 100 of the underwater housing section 20 for receiving mounting bolts (not shown) connecting the housing sections 20, 40 and designed to fracture at a predetermined impact load. The bottom surface 120 may further include a shaft collar 126 defining a recess in which a lower end 128 of an upper vertical shaft 130 is exposed. The lower end 128 of the upper vertical shaft 130 may include parallels longitudinally extending splines 132 that will mesh with the splines 108 of the breakaway connector 106 during assembly of the drive unit 12. Upper portions 134, 136 of the disconnect fittings 116, 118, respectively, also extend through the bottom surface 120 and have complimentary geometries to the lower portions 112 114 as will be illustrated and described more fully below.

Figure 12:
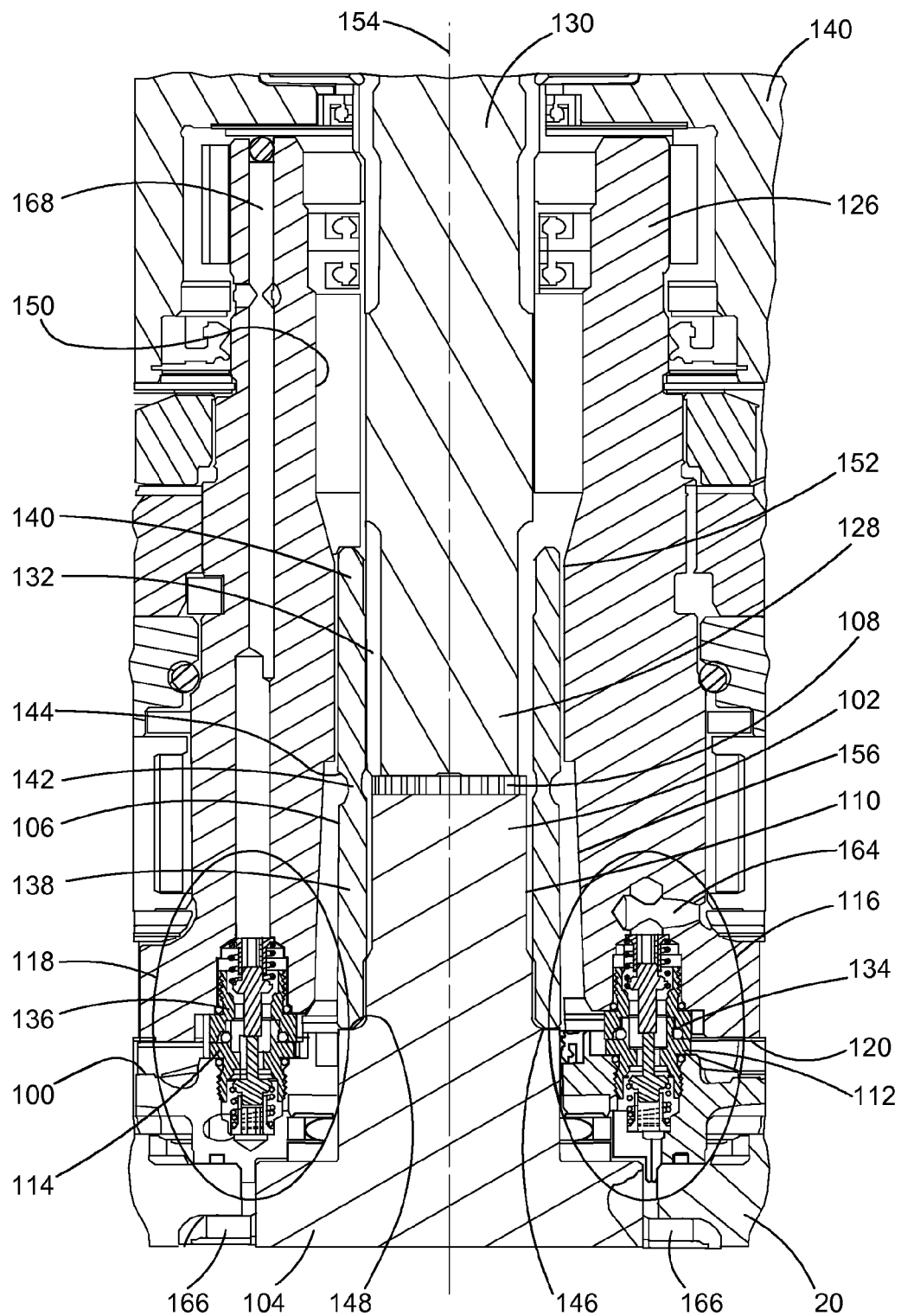
FIG. 12 is a cross-sectional view of a portion of the drive unit of FIG. 3 where the underwater housing section is mounted to the intermediate housing section.

FIG. 12 is a cross-sectional view of a central portion of the assembled drive unit 12 where the surfaces 100, 120 face and the vertical shafts 104, 130 are connected by the disconnect fitting 118. The splines 110, 132 of the ends 102, 128 of the vertical shafts 104, 130, respectively, mesh with the splines 108 of the breakaway connector 106 so that the connector 106 and the vertical shafts 104, 130 rotate together when the engine drive shaft 28 turns the input shaft 26 of the drive unit 12. The breakaway connector 106 has a lower section 138 disposed around the upper end 102 of the lower vertical shaft 104, and an upper section 140 disposed around the lower end 128 of the upper vertical shaft 130. The breakaway fitting sections 138, 140 have approximately equal outer diameters and wall thicknesses, and may include external splines 111 as discussed above, and are separated by an intermediate breakaway fitting section 142 having a reduced wall thickness and corresponding reduced strength so that the intermediate section 142 will yield or fail before the other sections 138, 140. In the illustrated embodiment, the reduction in thickness is achieved by machining or otherwise forming an outer annular groove 144 in an external surface of the breakaway connector 106 at the intermediate section 142, and machining or otherwise forming an inner annular groove 145 in an interior surface of the breakaway connector 106 opposite the outer annular groove 144. The inner annular groove 145 may include a generally flat vertical central portion so that a desired minimum thickness of the wall between the grooves 144, 145 may be achieved without the necessity and fabrication expense of precise alignment of the grooves opposite each other. Those skilled in the art will understand that the thickness of the intermediate section 142 may be reduced by providing one or the other of the grooves 144, 145, but not necessarily both. Alternatively, other methods may be used to provide the intermediate section 142 with reduced strength, such as hardening the sections 138, 140 and not hardening the intermediate section 142, forming the sections 138, 140, 142 from different materials with the intermediate section 142 being formed from a softer material, providing a uniform outer diameter for the sections 138, 140, 142 and forming openings through the external surface at the intermediate section 142 to reduce the amount of material and, correspondingly the strength, at the intermediate section 142, and the like.

When the drive unit 12 is assembled, the intermediate section 142 of the breakaway connector 106 may be disposed at an interface between the ends 102, 128 of the vertical shafts 104, 130. The upper end 102 of the lower vertical shaft 104 may have an outer diameter that is less than the outer diameter of the vertical shaft 104 below the end 102 to define a shoulder 146 that is engaged by a lower end 148 of the breakaway connector 106 to position the breakaway connector 106. The shaft collar 126 is mounted within and stationary with respect to the intermediate housing section 40, and has an inner surface defining a bore 150 that receives the vertical shafts 104, 130 for rotation therein. The shaft collar 126 may include a guide section 152 receiving the upper section 140 of the breakaway connector 106 and having an inner diameter that is greater than the outer diameter of the upper section 140 so that the upper section 140 may rotate within the guide section 152 without substantial lateral movement with respect to a common longitudinal axis 154 for the vertical shafts 104, 130 and breakaway connector 106. The shaft collar 126 may further include a lower undercut section 156 enclosing the lower section 138 and intermediate section 142 of the breakaway connector 106 and having an inner diameter greater than the inner diameter of the guide section 152 to allow the lower section 138 of the breakaway connector 106 and the upper end 102 of the lower vertical shaft 104 to move laterally within the undercut section 156 during a breakaway situation. The undercut section 156 may have a constant inner diameter or, as illustrated, may be tapered so that the inner diameter increases as the undercut section 156 extends downwardly from the guide section 152.

When the underwater housing section 20 is impacted by a submerged object from any direction with sufficient force for the mounting bolts to fracture and a breakaway condition to occur, the configuration of the breakaway connector 106 and shaft collar 126 allow the lower vertical shaft 104 to move laterally if necessary, and to disengage from the upper vertical shaft 130 in a manner that substantially prevents damage to the other components of the drive unit 12. As the underwater housing section 20 and, correspondingly, the lower vertical shaft 104 experience lateral movement and/or rotational movement about an axis that is not parallel to the longitudinal axis 154, forces are exerted by the upper end 102 of the vertical shaft 104 on the lower section 138 of the breakaway connector 106. If sufficient forces exist, the intermediate section 142 of the breakaway connector 106 will yield to allow movement of the lower section 138 of the breakaway connector 106 and the lower vertical shaft 104 without damage to the upper vertical shaft 130. The presence of the external splines 111 may allow the walls of the lower section 138 and/or the upper section 140 to fracture and allow separation of the ends 102 and/or 128 from the breakaway connector 106. The lower section 138 may ultimately engage the inner surface of the undercut section, and the upper end 102 of the lower vertical shaft 104 may move axially with respect to the lower section 138 to disengage the lower vertical shaft 104 from the breakaway connector 106.

Figure 13:
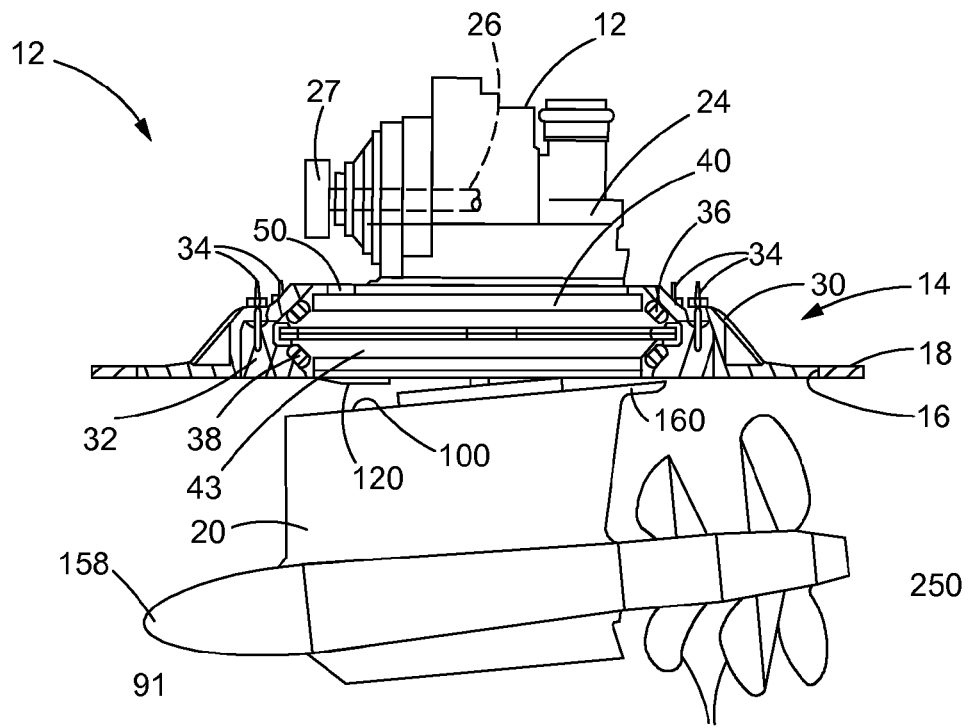
FIG. 13 is the assembly view of FIG. 2 of the boat hull and bottom-mounted drive unit of FIG. 1 with the underwater housing section broken away and partially rotated away from the intermediate housing section.
Figure 14:
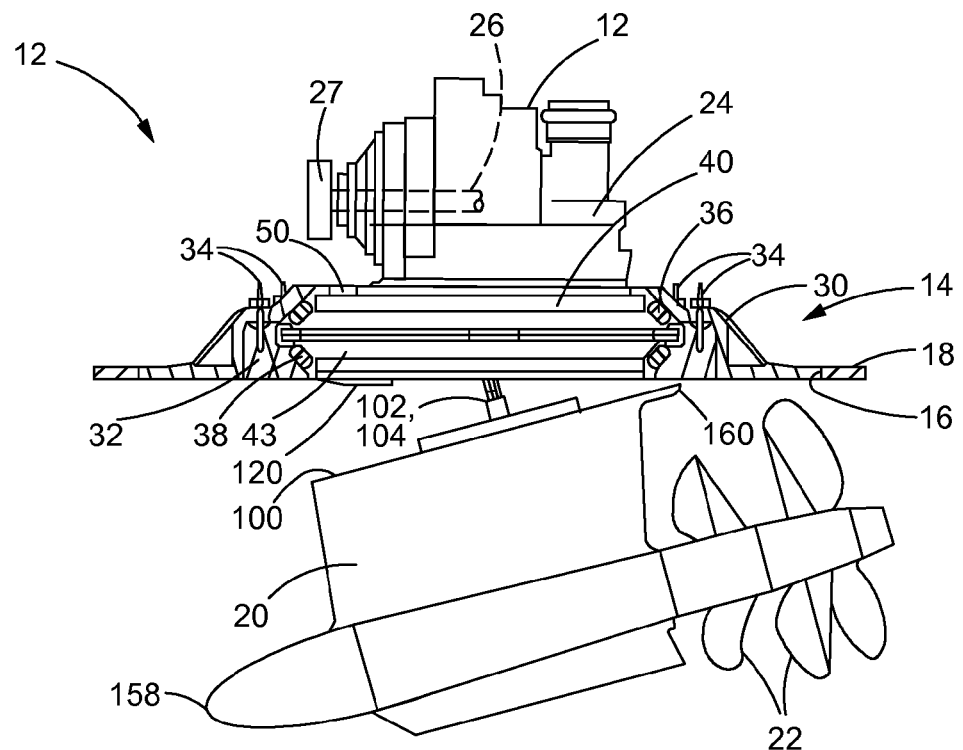
FIG. 14 is the assembly view of FIG. 2 of the boat hull and bottom-mounted drive unit of FIG. 1 with the underwater housing section further rotated away from the intermediate housing section.

In some breakaway conditions, the impact with the submerged object may result in substantial lateral forces on the underwater housing section 20 that do not immediately cause the upper end 102 of the lower vertical shaft 104 to move downwardly and out of engagement with the lower section 138 of the breakaway connector 106. These conditions can cause binding with the intermediate housing section 40 that may cause additional damage. Where the object strikes a forward tip 158 of the underwater housing section 20, the breakaway condition may also cause the propellers 22 to move closer to the bottom 18 of the boat hull 10. In order to promote downward movement of vertical shaft 104 and disengagement from the breakaway connector 106 and projection of the underwater housing section 20 and propellers 22 away from the boat hull 10, structures may be provided to push of the underwater housing section 20 away from the boat hull 10. Referring to FIG. 2, the underwater housing section 20 may be configured with a rearwardly extending projection or thumb 160 configured to engage the bottom 18 of the boat hull 10 in the event of a breakaway condition. When an object strikes a forward tip 158 of the underwater housing section 20, the impact creates a combination of lateral forces tending to push the underwater housing section 20, and a torque tending to rotate the underwater housing section 20 counter-clockwise as viewed in FIG. 2. As the underwater housing section 20 rotates, the thumb 160 may slide along and be engaged by the bottom 18 of the boat hull 10 such that the lateral forces and the torque on the underwater housing section 20 cause counterclockwise rotation about the point of contact between the thumb 160 and the bottom 18 as viewed in FIG. 13. As the underwater housing section 20 rotates about the thumb 160, the upper end 102 of the lower vertical shaft 104 rotates downwardly and out of engagement with the lower section 138 of the breakaway connector 106. The rotation also forces the underwater housing section 20 away from the bottom wall 18 to prevent engagement by the propellers 22 and further damage to the boat hull 10.

Returning to FIG. 12, the disconnect fittings 116, 118 are shown with their corresponding portions 112, 134 and 114, 136 engaged and in their open positions to allow fluid flow there through. The disconnect fitting 116 may connect an oil passage 164 of the intermediate housing section 40 with a lower gear case 166 of the underwater housing section 20, and the disconnect fitting 118 may connect an oil passage 168 in fluid communication with the gear housing section 24 to the lower gear case 166. Each of the disconnect fittings 116, 118 may have a generally similar configuration to allow fluid flow when the underwater housing section 20 is connected to the intermediate housing section 40, and to cut off fluid flow when the housing sections 20, 40 are detached from each other. Consequently, the following illustration and description of the disconnect fitting 116 and its components will be applies in a similar manner to the disconnect fitting 118.

Figure 15:
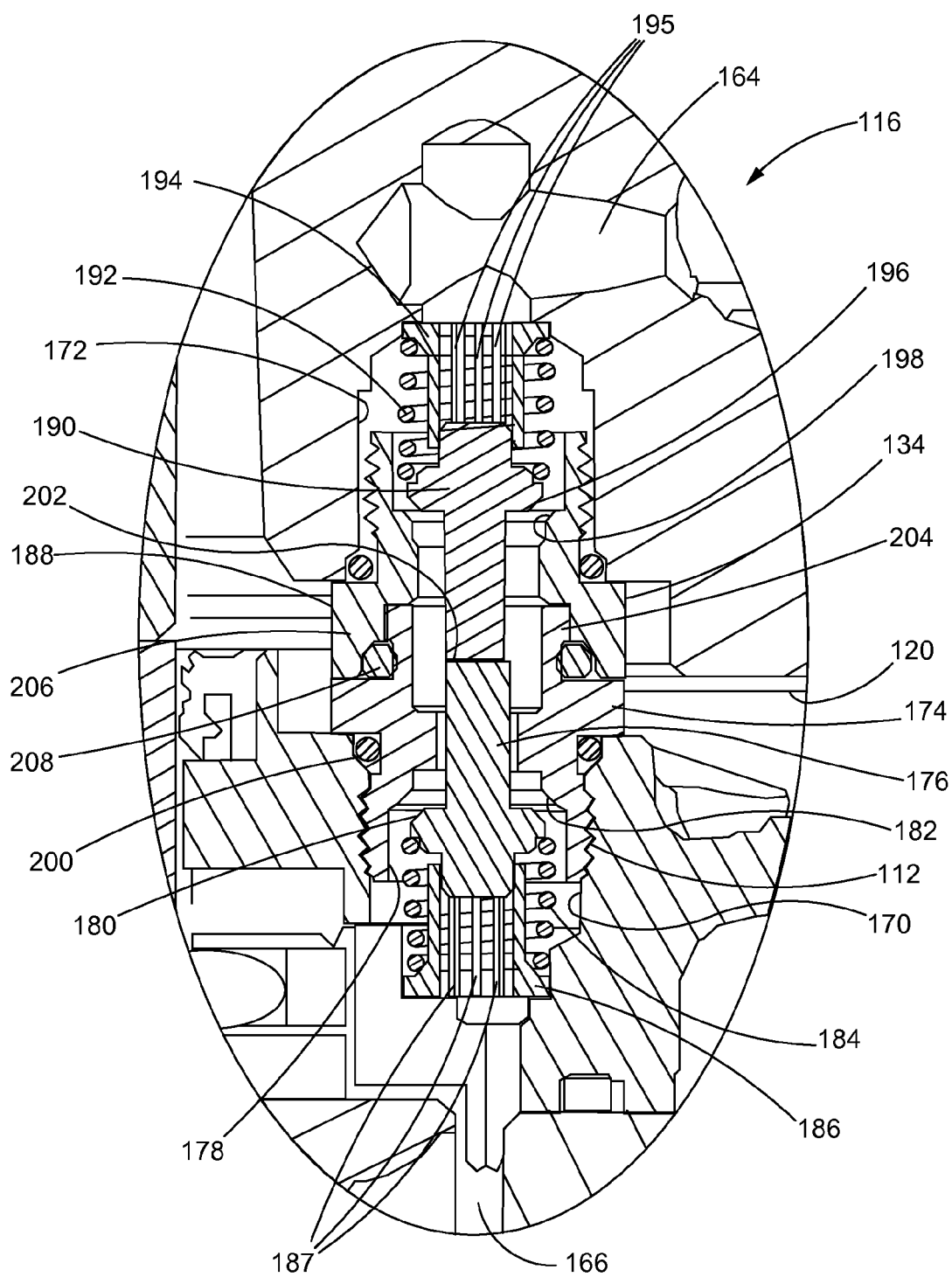

FIG. 15 provides an enlarged view of the disconnect fitting 116 shown in the assembled configuration from FIG. 12. The lower portion 112 of the disconnect fitting 116 is disposed within a bore 170 that places the top surface 100 of the underwater housing section 20 in fluid communication with the lower gear case 166, and the upper portion 134 is disposed within a bore 172 the places the bottom surface 120 of the intermediate housing section 40 in fluid communication with the oil passage 164. The lower portion 112 may include a valve body 174 having an external threaded portion having threads that are received by a corresponding internal threaded portion of the bore 172 retain the valve body 174 therein. The lower portion 112 further includes a valve pin 176 disposed and axially movable within a through bore 178 of the valve body 174 between an open position as shown and a closed position wherein a seating surface 180 of the valve pin 176 engages a valve seat 182 of the valve body 174 to prevent fluid flow through the lower portion 112. A resilient member 184, such as a coil spring, may be operatively connected between the valve pin 176 and a surface of the bore 170 to provide a force biasing the valve pin 176 toward the closed position. The lower portion 112 may further include a hollow cylindrical spacer sleeve 186 disposed between a lower end of the bore 170 and the valve pin 176 to limit the movement of the valve pin 176 toward the open position. The spacer sleeve 186 may include a plurality of longitudinally extending oil flow slots 187 allowing oil from the bore 170 to flow through to the lower gear case 166 when the valve pin 176 is in the open position.

The upper portion 134 of the disconnect fitting 116 has a generally similar configuration as the lower portion 112, including a valve body 188 threaded into the bore 172 and receiving a valve pin 190 biased by a resilient member 192 and having movement limited by a hollow cylindrical spacer sleeve 194 having oil flow slots 195 allowing oil from the oil passage 164 to flow into the bore 172 when the valve pin 190 is in the illustrated open position. The valve pin 190 moves axially between the open position and a closed position wherein a seating surface 196 of the valve pin 190 engages a valve seat 198 of the valve body 188 to prevent fluid flow between the oil passage 164 and the bottom surface 120 of the intermediate housing section 40. When the housing sections 20, 40 are assembled, the portions 112, 134 of the disconnect fitting 116 are aligned, and tips 200, 202 of the valve pins 176, 190, respectively, engage each other to force the seating surface 180, 196 out of engagement with the valve seats 182, 198, respectively, to place the oil passage 164 in fluid communication with the lower gear case.

Facing ends 204, 206 of the valve bodies 174, 188, respectively, along with a resilient seal member 208, such as an O-ring seal, may be configured and cooperate to form a substantially water-tight seal when the housing sections 20, 40 are assembled. The upper end 204 of the valve body 174 has an outer diameter that is less than an inner diameter of the lower end 206 of the valve body 188 so that the upper end 204 is inserted into the lower end 206 during assembly. The resilient seal member 208 is disposed around the upper end 204 and engaged by the inner surface of the lower end 206 of the valve body 188 when the upper end 204 is inserted therein to form a seal and prevent oil leakage between the housing sections 20, 40.

Figure 16:
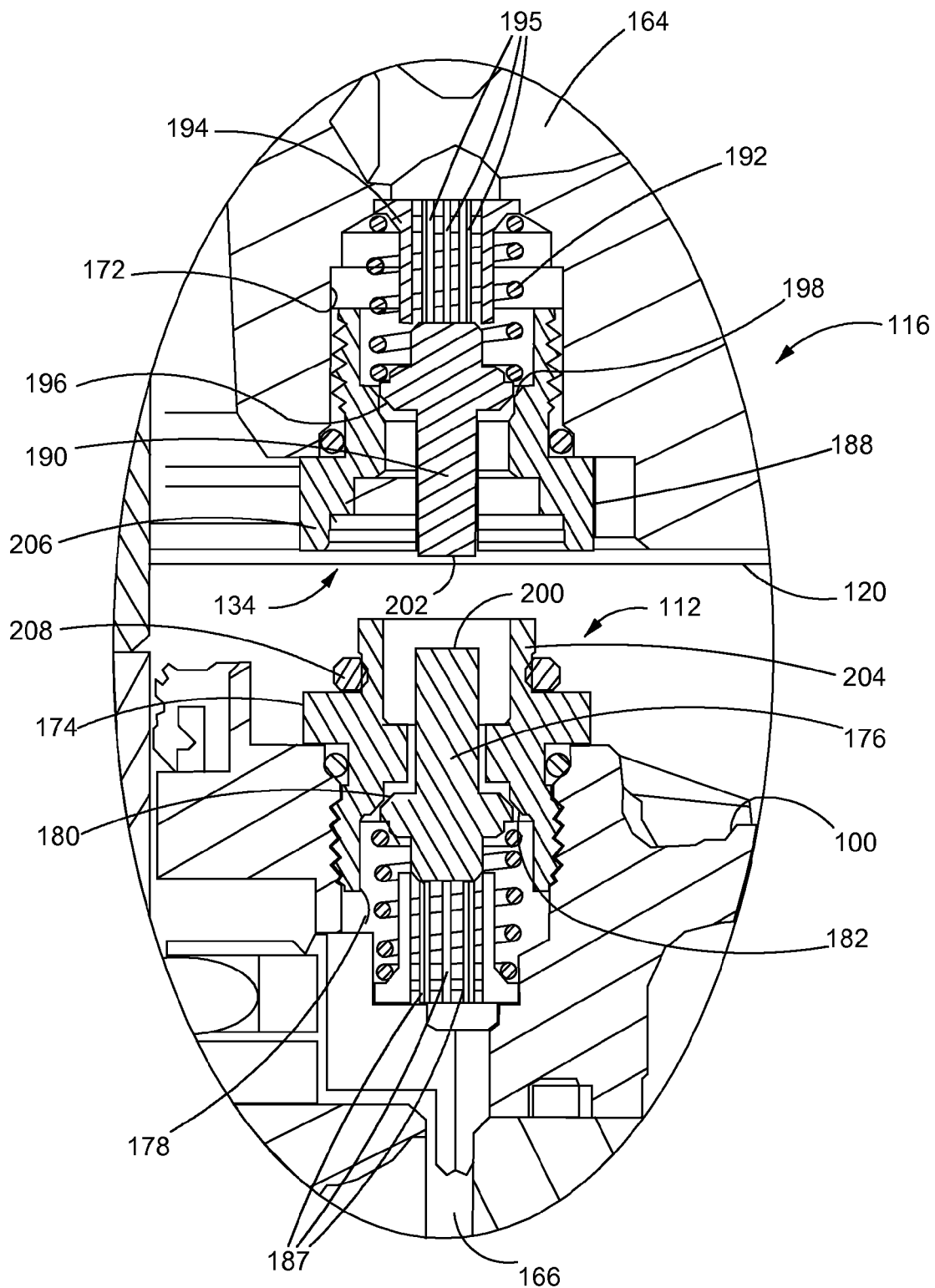

FIG. 16 illustrates the disconnect fitting 116 as the housing sections 20, 40 separate during a breakaway situation. As the housing sections 20, 40 move apart, the tips 200, 202 of the valve pins 176, 190 initially remain in contact but move toward the valve seats 182, 198 under the biasing forces of the springs 184, 192 as the upper end 204 of the valve body 174 and the resilient seal member 208 slide out of the lower end 206 of the valve body 188. When the tips 200, 202 separate, the seating surfaces 180, 196 come into contact with the corresponding valve seats 182, 198 to form seals substantially preventing leakage of liquid. In a breakaway some leakage (either oil out or water in) may occur as the housing sections 20, 40 separate and the pins 176, 190 move toward the closed position, but then leakage may not occur in either direction once the pins 176, 190 engage the seating surfaces 180, 196. At this point the lower portion 112 of the disconnect fitting 116 prevents fluid from the lower gear case 166 from leaking to the top surface 100 of the underwater housing section 20 and the upper portion 134 of the disconnect fitting 116 prevents fluid from the oil passage 164 from leaking to the bottom surface 120 of the intermediate housing section 40.

INDUSTRIAL APPLICABILITY

With reference to FIGS. 2 and 10, installation of the hull seal assembly 14 may be initiated during the assembly of the drive unit. As the intermediate housing section 40 is assembled to the underwater housing section 20, the clamp ring 32 may be positioned between the housing sections 20, 40. The clamp ring 32 is disposed around the intermediate housing section 40 and below the outwardly extending retention portion 43 with the upwardly facing clamp ring surface 72 facing the downwardly facing lateral edge surface 46 of the outwardly extending retention portion 43. At the same time, the lower ring seal 38 may also be installed around the intermediate housing section 40 and below the ribs 48 and the downwardly facing lateral edge surface 46. With the lower ring seal 38 in place between the downwardly facing lateral edge surface 46 and the upwardly facing clamp ring surface 72, the ribs 48 may be inserted through the open upper ends 78 of the corresponding rib receiving recesses 74 to align the outwardly extending retention portion 43 of the intermediate housing section 40 with the clamp ring 32. The lower ring seal 38 may be partially compressed between the downwardly facing lateral edge surface 46 and the upwardly facing clamp ring surface 72, and cover plates 92 may be attached to the clamp ring 32 at the open upper end 78 of each of the rib receiving recesses 74 to retain the ribs 48 and correspondingly retain the clamp ring 32 in position relative to the intermediate housing section 40.

As the underwater housing section 20 is drawn toward the intermediate housing section 40, the ends 102, 128 of the vertical shafts 104, 130 and the breakaway connector 106 are aligned and the ends 102, 128 are inserted into the corresponding sections 138, 140 of the breakaway connector 106 with the splines 108, 132 meshing with the splines 110. At the same time the lower portions 112, 114 of the disconnect fittings 116, 118 are aligned with the upper portions 134, 136 extending from the bottom surface 120 of the intermediate housing section 40. The upper ends 204 of the lower portions 112, 114 are inserted into the lower ends 206 of the upper portions 134, 136 and the tips 200, 202 engage each other. The valve pins 176, 190 are pushed out of engagement with the valve seats 182, 198 against the biasing forces of the springs 184, 192 to place the oil passage 164 in fluid communication with the lower gear case 166. After the surfaces 100, 120 of the housing sections 20, 40 are brought together, the mounting pins are installed in the bores 124 of the flanges 122 to secure the housing sections 20, 40.

With the clamp ring 32 installed on the drive unit 12, the drive unit 12 and the clamp ring 32 may be installed in the opening 16 through the bottom wall 18 of the boat hull 10. Before inserting the input shaft 26, the input flange 27 and the gear housing section 24 of the drive unit 12 through the opening 50 of the hull support ring 30, the upper ring seal 36 may be placed over the gear housing section 24 and down onto the upwardly facing lateral edge surface 44 of the outwardly extending retention portion 43. Once the upper ring seal 36 is in place, the input shaft 26 and the gear housing section 24 are inserted through the opening 50 of the hull support ring 30. The gear housing section 24 is inserted through the opening 50 until the outwardly extending retention portion 43 enters the hull support ring 30 and the upper ring seal 36 is engaged by the downwardly facing support ring surface 64 and the downwardly facing inner surface 62 faces and engages the upwardly facing surface 76 of the clamp ring 32. At this point, the downwardly facing inner surface 62 is engaged by the upper edge of the clamp ring seal 84. The studs 34 are then installed in corresponding pairs of bores 66, 80 to secure the clamp ring 32 to the hull support ring 30 and complete the installation of the drive unit 12 within the opening 16 in the bottom wall 18 of the boat hull 10.

When the clamp ring 32 is secured to the hull support ring 30, the ring seals 36, 38 are compressed to form upper and lower substantially water-tight seals. Compression of the ring seals 36, 38 causes the ring seals 36, 38 to deform to match the shapes of the surfaces applying pressure to the ring seals 36, 38. Consequently, the tapered and generally parallel surfaces 44, 64 cause the upper ring seal 36 to have generally parallel upper and lower sides and rounded ends. Similarly, the lower ring seal 38 has generally parallel upper and lower sides matching the shapes of generally parallel surfaces 46, 72.

Figure 17:
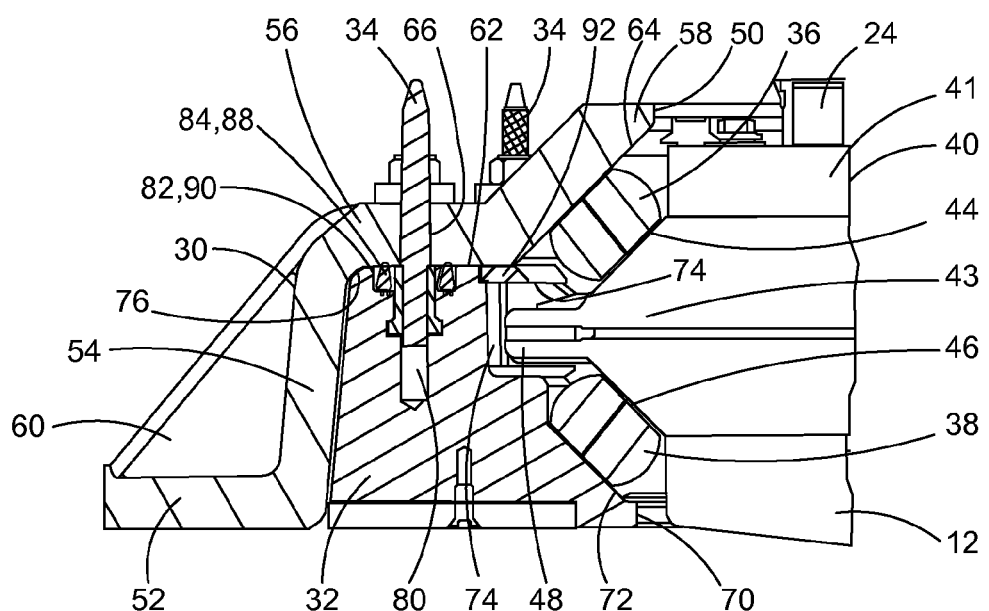
FIG. 17 is an enlarged view of left portion of the hull seal assembly as viewed in FIG. 2.

As most clearly apparent from FIG. 17, the heights of the rib receiving recesses 74 are larger than the heights of the ribs 48 disposed therein. As a result, the ribs 48 may essentially float within the rib receiving recesses 74 and the hull seal assembly 14 may allow an amount of upward and downward movement of the ribs 48 and, correspondingly, the drive unit 12 relative to the boat hull 10. Consequently, the drive unit 12 may move vertically in response to upward and downward forces applied thereto. Moreover, the hull seal assembly 14 will allow for an amount of rotation of the drive unit 12 about horizontal axes. As a rib 48 moves upwardly or downwardly, the portion of one of the ring seals 36, 38 proximate the rib 48 and in the direction of movement of the rib 48 may further compress, while the portion of the other ring seal 36, 38 may partially decompressed as the outwardly extending retention portion 43 moves within the hull seal assembly 14 but maintains contact with the corresponding surfaces. The ribs 48, rib receiving recesses 74 and cover plates 92 may also provide mechanical hard stops that prevent over-compression of the ring seals 36, 38 and prevent the ring seals 36, 38 from sliding out of position during extreme loading events where the underwater housing section 20 hits an object in the water at any speed. Consequently, the substantially water-tight seal of the hull seal assembly 14 may be maintained as the drive unit 12 moves relative to the boat hull 10. In a similar manner, the rib receiving recesses 74 may be wider than the corresponding ribs 48 such that an amount of rotation of the drive unit 12 about a vertical axis is possible without compromising the integrity of the water-tight seal of the hull seal assembly 14 to allow leakage of water into the inboard compartment of the boat hull 10. Though illustrated herein as having the ribs 48 extending from the outwardly extending retention portion 43 of the intermediate housing section 40, those skilled in the at will understand that the ribs 48 may extend from other locations on the drive unit 12, and the rib receiving recesses 74 may be defined in the clamp ring 32, the hull support ring 30 or any other appropriate structure of the boat hull 10 or hull seal assembly 14 to perform the necessary retention and compression preventive functions described herein.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A breakaway connector for a bottom-mounted drive unit for a watercraft hull where the bottom-mounted drive unit has a first housing section having a bottom surface and an upper vertical shaft having a lower end extending through the bottom surface of the first housing section, and a second housing section having a top surface and a lower vertical shaft having an upper end extending through the top surface of the second housing section, the breakaway connector comprising:

an upper connector section receiving the lower end of the upper vertical shaft;

a lower connector section receiving the upper end of the lower vertical shaft; and an intermediate connector section connecting the upper connector section to the lower connector section and having a reduced strength relative to a strength of the upper connector section and the lower connector section to yield and allow the lower connector section to displace relative to the upper connector section, wherein the intermediate connector section comprises an inner groove defined in an inner surface of the intermediate connector section.

2. A breakaway connector for a bottom-mounted drive unit according to claim 1, wherein a thickness of the intermediate connector section is less than a thickness of the upper connector section and the lower connector section.

3. A breakaway connector for a bottom-mounted drive unit according to claim 1, wherein the intermediate connector section comprises an outer annular groove defined in an outer surface of the intermediate connector section.

4. A breakaway connector for a bottom-mounted drive unit according to claim 1, wherein the intermediate connector section has a plurality of openings formed through an external surface of the intermediate connector section.

5. A breakaway connector for a bottom-mounted drive unit according to claim 1, wherein the lower end of the upper vertical shaft and the upper end of the lower vertical shaft have circular cross-sections and cylindrical outer surfaces, and wherein the breakaway connector comprises an inner surface receiving the lower end of the upper vertical shaft and the upper end of the lower vertical shaft and engaging the outer surfaces.

6. A breakaway connector for a bottom-mounted drive unit according to claim 5, wherein the lower end of the upper vertical shaft and the upper end of the lower vertical shaft have a plurality of parallel longitudinally extending splines on the outer surfaces, wherein the breakaway connector comprises a plurality of parallel longitudinally extending splines on the inner surface that mess with the longitudinally extending splines of the lower end of the upper vertical shaft and the upper end of the lower vertical shaft.

7. A breakaway connector for a bottom-mounted drive unit according to claim 1, wherein the lower vertical shaft comprises a shoulder, and the lower connector section comprises an end surface engaging the shoulder of the lower vertical shaft to locate the intermediate connector section at an interface between the lower end of the upper vertical shaft and the upper end of the lower vertical shaft.

8. A disconnect fitting for a bottom-mounted drive unit for a watercraft hull where the bottom-mounted drive unit has a first housing section having a bottom surface and a second housing section having a top surface, the disconnect fitting comprising:
   an upper first portion comprising:
   a first valve body having a lower end extending through the bottom surface of the first housing section and a first through bore defining a passage through the first valve body having a first valve seat,
   a first valve pin disposed within the first through bore and having a first seating surface, wherein the first valve pin is movable between an open position with the first seating surface disengaged from the first valve seat and a closed position with the first seating surface engaging the first valve seat to form a seal substantially preventing liquid from leaking into and out of the first housing section through the first through bore, and
   a first resilient member engaging the first valve pin and biasing the first valve pin toward the closed position; and
   a lower second portion comprising:
   a second valve body having an upper end extending through the top surface of the second housing section and a second through bore defining a passage through the second valve body having a second valve seat,
   a second valve pin disposed within the second through bore and having a second seating surface, wherein the second valve pin is movable between an open position with the second seating surface disengaged from the second valve seat and a closed position with the second seating surface engaging the second valve seat to form a seal substantially preventing liquid from leaking into and out of the second housing section through the second through bore, and
   a second resilient member engaging the second valve pin and biasing the second valve pin toward the closed position,
   wherein the lower end of the first valve body and the upper end of the second valve body are aligned and are brought together so that the first valve pin and the second valve pin engage and move to the open positions to place an interior of the first housing section in fluid communication with an interior of the second housing section without leakage of fluid through the lower end of the first valve body and the upper end of the second valve body.

9. The disconnect fitting for a bottom-mounted drive unit according to claim 8, wherein the lower end of the first valve body has an inner diameter, the upper end of the second valve body has an outer diameter that is greater than the inner diameter of the lower end of the first valve body, and wherein the upper end of the second valve body is inserted into the lower end of the first valve body.

10. The disconnect fitting for a bottom-mounted drive unit according to claim 9, wherein the lower second portion comprises an annular resilient seal member disposed around the upper end of the lower second portion and engaging the lower end of the upper first portion and forming a substantially water-tight seal there between.

11. The disconnect fitting for a bottom-mounted drive unit according to claim 8, where the upper first portion comprises a first hollow cylindrical sleeve disposed within the first through bore and engaging the first valve pin to limit the movement of the first valve pin toward the open position, and where the lower second portion comprises a second hollow cylindrical sleeve disposed within the second through bore and engaging the second valve pin to limit the movement of the second valve pin toward the open position.

12. The disconnect fitting for a bottom-mounted drive unit according to claim 8, wherein the first housing section has a first bore with first internal threads and the second housing section has a second bore with second internal threads, the first valve body has first external threads received by and meshing with the first internal threads to retain the upper first portion in the first bore, and the second valve body has second external threads received by and meshing with the second internal threads to retain the lower second portion in the second bore.

13. The disconnect fitting for a bottom-mounted drive unit according to claim 8, wherein the first valve pin has a first tip and the second valve pin has a second tip, and wherein the first tip and the second tip engage to move the first valve pin and the second valve pin to the open positions.

14. A bottom-mounted drive unit for a watercraft hull, comprising:
   a first housing section having a bottom surface, comprising:

an upper vertical shaft having a shaft lower end extending through the bottom surface of the first housing section, and a disconnect fitting upper portion having a lower end extending through the bottom surface of the first housing section, wherein the disconnect fitting upper portion has a normally closed position with a seal substantially preventing leakage of liquid from an interior of the first housing section to the bottom surface of the first housing section, and an open position placing the interior of the first housing section in fluid communication with the bottom surface of the first housing section;

a second housing section having a top surface, comprising:

a lower vertical shaft having a shaft upper end extending through the top surface of the second housing section, and a disconnect fitting lower portion having an upper end extending through the top surface of the first housing section, wherein the disconnect fitting lower portion has a normally closed position with a seal substantially preventing leakage of liquid from an interior of the second housing section to the top surface of the second housing section, and an open position placing the interior of the second housing section in fluid communication with the top surface of the second housing section; and a breakaway connector having a lower section, an upper section and a reduced strength intermediate section, wherein the lower section of the breakaway connector receives and engages the upper end of the lower vertical shaft and the upper section of the breakaway connector receives and engages the lower end of the upper vertical shaft so that the lower vertical shaft, the upper vertical shaft and the breakaway connector rotate together about a common longitudinal axis and with the intermediate portion of the breakaway connector disposed at an interface between the upper end of the lower vertical shaft and the lower end of the upper vertical shaft, and wherein the disconnect fitting upper portion and the disconnect fitting lower portion are aligned and engage each other to place the disconnect fitting upper portion and the disconnect fitting lower portion in the open positions and thereby place the interior of the first housing in fluid communication with the interior of the second housing without leakage of fluid to the top surface of the first housing portion and the bottom surface of the second housing portion.

15. The bottom-mounted drive unit according to claim 14, wherein the first housing portion comprises a shaft collar having a guide section receiving the upper section of the breakaway connector and having an inner diameter that is greater than an outer diameter of the upper section of the breakaway connector so that the upper section of the breakaway connector may rotate within the guide section without substantial lateral movement with respect to the common longitudinal axis, and an undercut section receiving the lower section of the breakaway connector and having an outer diameter that is greater than an outer diameter of the lower section of the breakaway connector to allow the lower section of the breakaway connector and the upper end of the lower vertical shaft to move laterally with respect to the common longitudinal axis.

16. The bottom-mounted drive unit according to claim 15, wherein the inner diameter of the undercut section of the shaft collar increases as the undercut section extends away from the guide section of the shaft collar.

17. The bottom-mounted drive unit according to claim 14, wherein the lower end of the disconnect fitting upper portion has an inner diameter and the upper end of the disconnect fitting lower portion has an outer diameter that is less than the inner diameter of the lower end of the disconnect fitting upper portion, and the upper end of the disconnect fitting lower portion is received by the lower end of the disconnect fitting upper portion.

18. The bottom-mounted drive unit according to claim 17, wherein the disconnect fitting upper portion comprises an annular resilient seal member disposed around the upper end of the disconnect fitting lower portion and engaging the lower end of the disconnect fitting upper portion and forming a substantially water-tight seal there between.

19. The bottom-mounted drive unit according to claim 14, wherein the intermediate section of the breakaway connector comprises an annular groove defined in an outer surface of the intermediate section.

20. The bottom-mounted drive unit according to claim 14, wherein the second housing section comprises a rearwardly extending projection causing the second housing section to pivot about the rearwardly extending projection when the second housing section breaks away from the first housing section.

\* \* \* \* \*